US011480971B2

(12) United States Patent
Isele et al.

(10) Patent No.: US 11,480,971 B2
(45) Date of Patent: Oct. 25, 2022

(54) SYSTEMS AND METHODS FOR GENERATING INSTRUCTIONS FOR NAVIGATING INTERSECTIONS WITH AUTONOMOUS VEHICLES

(71) Applicant: HONDA MOTOR CO., LTD., Tokyo (JP)

(72) Inventors: David Isele, Sunnyvale, CA (US); Gholamreza Rahimi, Charlottesville, VA (US); Akansel Cosgun, Melbourne (AU); Kaushik Subramanian, Richmond, CA (US); Kikuo Fujimura, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 435 days.

(21) Appl. No.: 15/968,460

(22) Filed: May 1, 2018

(65) Prior Publication Data

US 2019/0339702 A1    Nov. 7, 2019

(51) Int. Cl.
    G05D 1/02    (2020.01)
    G05D 1/00    (2006.01)
    G06N 3/04    (2006.01)

(52) U.S. Cl.
    CPC ......... *G05D 1/0221* (2013.01); *G05D 1/0088* (2013.01); *G06N 3/04* (2013.01); *G06N 3/0454* (2013.01)

(58) Field of Classification Search
    CPC .... G05D 1/0221; G05D 1/0088; G05D 1/024; G05D 1/0246; G05D 1/0257;
    (Continued)

(56) References Cited

U.S. PATENT DOCUMENTS 9,507,346 B1    11/2016    Levinson et al.
9,511,767 B1    12/2016    Okumura et al.
(Continued)

FOREIGN PATENT DOCUMENTS

CN    202453735 U    9/2012
CN    104819724 A    8/2015
(Continued)

OTHER PUBLICATIONS

Junedmunshi, "How to implement epsilon greedy strategy/policy," Mar. 30, 2012, https://junedmunshi.wordpress.com/2012/03/30/how-to-implement-epsilon-greedy-strategy-policy/ (Year: 2012).*
(Continued)

*Primary Examiner* — Christian Chace
*Assistant Examiner* — Jordan S Fei
(74) *Attorney, Agent, or Firm* — ArentFox Schiff LLP (57) ABSTRACT

Systems and methods for generating instructions for a vehicle to navigate an unsignaled intersection are provided. The method may include: generating an expected return over a sequence of actions of the vehicle; determining an optimal policy by selecting an action with a maximum value for the vehicle; executing dynamic frame skipping to expedite learning a repeated action of the vehicle; prioritize an experience replay by utilizing an experience replay buffer to break correlations between sequential steps of the vehicle; generate a plurality of state-action representations based on at least one of the expected return, the optimal policy, the dynamic frame skipping, or the prioritized experience replay; generate the instructions for navigating the unsignaled intersection based on the plurality of state-action representations; and transmit the instructions for navigating the unsignaled intersection to the vehicle such that the vehicle executes the instructions to navigate the unsignaled intersection.

20 Claims, 5 Drawing Sheets

(58) Field of Classification Search
CPC .. G05D 1/0263; G05D 1/0223; G05D 1/0214; G05D 1/028; G05D 1/0276; G05D 2201/0213; A61B 5/7264; G06N 3/04; G06N 3/0454; G06N 7/005; G06N 3/006; G06N 3/08; G06N 3/0481; G06N 3/02; G06N 7/046; G06N 3/049; G06N 3/06; B60W 60/0011; B60W 60/0027; B60W 60/00276; B60W 30/18159; B60G 2600/1878; B29C 66/965; B29C 2945/76979; B23K 31/006; B25J 9/161; B64G 2001/247; E21B 2200/22; F05B 2270/09; F16H 2061/0084; F16H 2061/0087; F02D 41/1405; F03D 7/046; G01N 29/4481; G01N 2201/1296; G01N 33/0034; G05B 2219/25255; G05B 13/027; G05B 2219/32335; G05B 2219/33025; G05B 2219/33027; G05B 2219/41054; G05B 2219/39271; G05B 13/0285; G05B 13/029; G05B 2219/33015; G05B 2219/34066; G05B 2219/33014; G05B 2219/33029; G05B 2219/33044; G05B 2219/40529; G05B 2219/33026; G05B 23/0281; G05B 2219/33021; G05B 2219/33039; G05B 2219/33041; G05B 2219/39286; G05B 2219/39311; G05B 2219/39312; G05B 2219/40494; G05B 2219/33013; G05B 2219/33024; G05B 2219/33035; G05B 2219/34081; G05B 23/0254; G05B 23/024; G06F 11/1476; G06F 2207/4824; G06F 11/2263; G06F 30/27; G10K 2210/3038; G01S 7/417; G06T 3/4046; G06T 9/002; G06T 2207/20084; G06V 10/82; G06V 10/454; G06V 30/18057; G08B 29/186; G10L 15/16; G10L 25/30; G10L 17/18; G11B 20/10518; G10H 2250/311; G10H 2210/031; G06K 7/1482; H04L 2025/03464; H04L 2012/5686; H04L 25/0254; H04L 25/03165; H04L 2025/03554; H04L 45/08; H04L 41/16; H04Q 2213/13343; H04Q 2213/343; H04Q 2213/054; H02P 21/0014; H02P 23/0018; H02P 23/0031; H02P 21/0025; H03H 2017/0208; H03H 2222/04; H01J 2237/3042; H04R 25/507; H02H 1/0092; H04N 21/4666; H01M 8/04992; Y10S 128/925; B60L 2260/46; F02N 11/0829; F23N 2223/48

See application file for complete search history.

(56) References Cited

U.S. PATENT DOCUMENTS

| | | |
|---|---|---|
| 2013/0018572 A1 | 1/2013 | Jang |
| 2014/0032089 A1 | 1/2014 | Aoude et al. |
| 2014/0136045 A1 | 5/2014 | Zhu et al. |
| 2014/0309914 A1 | 10/2014 | Scofield et al. |
| 2014/0343830 A1 | 11/2014 | Elwart et al. |
| 2015/0329107 A1 | 11/2015 | Meyer et al. |
| 2016/0097849 A1 | 4/2016 | Nichols et al. |
| 2016/0161271 A1 | 6/2016 | Okumura |
| 2016/0179093 A1 | 6/2016 | Prokhorov |
| 2016/0187881 A1 | 6/2016 | Lee et al. |
| 2016/0231746 A1 | 8/2016 | Hazelton et al. |
| 2016/0357188 A1 | 12/2016 | Ansari |
| 2017/0031359 A1 | 2/2017 | Shashua et al. |
| 2017/0057514 A1 | 3/2017 | Toyoda et al. |
| 2018/0285735 A1* | 10/2018 | Baum ............... G06F 9/30054 |
| 2019/0108448 A1* | 4/2019 | O'Malia ............ G06N 3/04 |
| 2019/0286153 A1* | 9/2019 | Rankawat ........... G06T 7/11 |
| 2019/0299978 A1* | 10/2019 | Balakrishnan ..... B62D 15/0285 |
| 2019/0339702 A1* | 11/2019 | Isele .................. G06N 3/006 |

FOREIGN PATENT DOCUMENTS

| | | |
|---|---|---|
| DE | 10 2014 208 434 A1 | 11/2015 |
| WO | WO 2016/126321 A1 | 8/2016 |
| WO | WO 2017/015951 A1 | 2/2017 |

OTHER PUBLICATIONS

Alonso, J., et al., "Autonomous vehicle control systems for safe crossroads." Transportaion research part C: emerging technologies, vol. 19, No. 6, pp. 1095-1110, 2011.

Alshiekh, M., et al., "Safe Reinforcement Learning via Shielding," AAAI Conference of Artificial Intelligence (AAAI), 2018.

Bojarski, M., et al., End to End Learning for Self-Driving Cars, arXiv: 1604.07316, 2016.

Bouton, M., et al., "Belief State Planning for Autonomously Navigating Urban Intersections," IEEE Intelligent Vehicles Symposium (IV), 2017.

Brechtel, S., et al., "Probabilistic Decision-Making under Uncertainty for Autonomous Driving using Continuous POMDPs," 2014 IEEE 17th International Conference on Intelligent Transportation Systems (ITSC), Qingdao, China, pp. 392-399, Oct. 8-11, 2014.

Cosgun, A., et al., "Towards Full Automated Drive in Urban Environments: A Demonstration in GoMentum Station, California," IEEE Intelligent Vehicles Symposium (IV), 2017.

Dao, et al., Markov-Based Lane-Positioning Using Inter-Vehicle Communication, IEEE Transactions on Intelligent Transportation Systems, vol. 8, No. 4, pp. 641-650, 2007.

Ferguson, D., et al., "A Reasoning Framework for Autonomous Urban Driving," in Intelligent Vehicles Symposium, 2008 IEEE, pp. 775-780, 2008.

Fletcher, L, et al., "The MIT—Corneil Collision and Why it Happened," Journal of Field Robotics, vol. 25, No. 10, pp. 775-807, 2008.

Gillula, J., et al., "Reducing Conservativeness in Safety Guarantees by Learning Disturbances Online: Iterated Guaranteed Safe Online Learning." Robotics: Science and Systems VIII, p. 81, 2013.

Hafner, M., et al., "Cooperative Collision Avoidance at Intersections: Algorithms and Experiments," IEEE Transactions on Intelligent Transportation Systems, vol. 14, No. 3, pp. 1162-1175. 2013.

Heess, N., et al., "Memdry-based control with recurrent neral networks," arXiv:1512.01155, 2015.

Hinton, G., et al., "Lecture 6.5-rmsprop, coursera: Neural Networks for Machine Learning," University of Toronto, Tech. Rep, 2012.

Isele, D., et al., "Navigating Occluded intersections with Autonomous Vehicles using Deep Reinforcement Learning."

Isele, D., et al., "Selective Experience Replay for Lifelong Learning," AAAI Conference on Artificial Intelligence (AAAI), 2018.

Isele, D., et al., Transferring Autonomous Driving Knowledge on Simulated and Real Intersections, International Conference on Machine Learning Workshop (ICML-WS), 2017.

Kammel, S., et al., "Team AnnieWAY's Autonomous System for the DARPA Urban Challenge 2007." in the DARPA Urban Challeng. Springer, pp. 359-391, 2009.

Krajzewicz, D., et al., "Recent developmentand applications of SUMO-simulation of urban mobility," International Journal on Advances in Systems and Measurements (IARIA), vol. 5, Nos. 3&4, 2012.

Krauss S., "Microscopic Modeling of Traffic Flow: Investigation of Collision Free Vehicle Dynamics," Ph.D. dissertation, Deutsches Zentrum fuer Luft-und Raumfahrt, 1998.

Lakshminarayanan, A., et al., "Dynamic Frame skip Deep Q Network," Rise IIL, Indian Institute of Technology, Madras, 2016.

Mnih, V., et al., "Playing Atari with Deep Reinforcement Learning," arXiv:1312.5602, 2013.

(56) References Cited

OTHER PUBLICATIONS

Montemerlo, M., et al., "Junior: The Stanford Entry in the Urban Challenge," Journal of field Robotics, vol. 25, No. 9, pp. 569-597, 2008.

Nhtsa, Quick Facts 2015, [Online] Available: https://crashstats.nhtsa.dot.gov/Api/Public/ViewPublication/812348, accessed Jan. 29, 2017.

Petit J., et al., "Remote Attacks on Automated Vehicles Sensors: Experiments on Camera and LiDAR," Black Hat Europe, Nov. 2015.

Rakha, et al., "Eco-driving at signalized intersections using v2i communication," in Intelligent Transportaion Systems (ZITSC), 14th International IEEE Conference on. IEEE, pp. 341-346, 2011.

Schaul, T., et al., "Prioritized Experience Replay," arXiv:1511.05952, 2015.

Shwartz, S., et al., "Safe, Multi-Agent, Reinforcement Learning for Autonomous Driving,"arXiv preprint arXiv:1610.03295, 2016.

Song, et al., "Intention-Aware Autonomous Driving Decision-Making in Uncontrolled Intersection," Mathematical Problems in Engineering, vol. 2016, 2016.

Treiber, M., "Congested Traffic States in Empirical Observations and Microscopic Simulations," Physical Review E, vol. 62, No. 2, p. 1805, 2000.

Urmson, C., et al., "Autonomous Driving in Urban Environments: Boss and the Urban Challenge," Journal of Field Robotics, vol. 25, No. 8, pp. 425-466, 2008.

Van Der Horst, R., "Time-to-Collision and Collision Avoidance Systems," 1993.

Vogel, K., "A comparison of headway and time to collision as safety indicators," Accident Analysis and Prevention vol. 35, No. 3, pp. 427-433, 2003.

Wang, et al., "Dueling Network Architectures for Deep Reinforcement Learning," arXiv:1511.06581, 2015.

Zhang, M., et al., "Learning Deep Neural Network Policies with Continuous Memory States," in Robotics and Automation (ICRA), IEEE International Conference on. IEEE, pp. 520-527, 2016.

Ziegler, J., et al., "Making Bertha Drive—An Autonomous Journey on a Historic Route," IEEE Intelligent Transportation Systems Magazine, vol. 6, No. 2, pp. 8-20, 2014.

Knill, C., et al., "A Direct Scattering Model for Tracking Vehicles With High-Resolution Radars," in Inteliigent Vehicles Symposium (IV), IEEE, pp. 298-303, 2016.

Minderhoud, M., et al., Extended time-to-collision measures for road traffic safety assessment, Accident Analysis and Prevention, vol. 33, No. 1, pp. 89-97, 2001.

Watkins, C.J., et al., "Q-Learning," Machine Learning, vol. 8, No. 3-4, pp. 279-292, 1992.

* cited by examiner

SYSTEMS AND METHODS FOR GENERATING INSTRUCTIONS FOR NAVIGATING INTERSECTIONS WITH AUTONOMOUS VEHICLES

TECHNICAL FIELD

The subject matter herein relates to methods and systems for automated driving of vehicles.

BACKGROUND

In order to successfully navigate through an unsignaled intersection, a driver must understand vehicle dynamics, interpret the intent of other drivers, and behave predictably so that other drivers can appropriately respond. However, learning this behavior in autonomous vehicles requires optimizing multiple conflicting objectives including safety, efficiency, and minimizing the disruption of traffic. Balancing between safety, efficiency, and minimizing disruption of traffic can be challenging even for human drivers. Consequently, one of the most challenging problems for autonomous vehicles is to handle unsignaled intersections in urban environments. The challenge arises most out of unpredictable autonomous driving system behavior. While rule-based intersection handling methods offer reliable and easy-to-interpret solutions, these methods may result in sub-optimal behavior and task performance.

Previous rule-based strategies include cooperative and heuristic approaches. Cooperative approaches require vehicle-to-vehicle communication, and therefore, are not scalable to general intersection handling. Heuristic approaches are rule-based methods based on time-to-collision (TTC). While TTC has many benefits, it also has limitations. For example, TTC models assume constant velocity, which ignores nearly all information concerning driver intent. Additionally, the often unpredictable behavior of human drivers may complicate the use of rule-based algorithms. As such, in many cases, an autonomous driving system using TTC may be overly cautious, which may create unnecessary delays.

Other machine learning based approaches have been used for intersection handling, such as imitation learning, online planning, and offline learning. While each of these approaches may have advantages, they also have disadvantages. For example, in imitation learning, the policy is learned from a human driver. However, this policy does not offer a solution if an autonomous driving system finds itself in a state that is not part of the training data, e.g., the state was not previously learned. Online planners compute a best action to take by simulating future states from the current time step. While online planners based on partially observable Monte Carlo Planning (POMCP) have been shown to handle intersections, they rely on the existence of an accurate generative model. Offline learning approaches tackle the intersection problem, often by using Markov Decision Processes (MDP) in the back-end. Offline learning may involve training a system on collected data, which enables the system to train on large amounts of data and often results in a system that is fast at runtime. However, one example disadvantage is that the resultant system is then "fixed" and may not be able to adapt to new situations.

SUMMARY

This summary is provided to introduce a selection of concepts in a simplified form that is further described below in the DETAILED DESCRIPTION. This summary is not intended to identify key features of the claimed subject matter, nor is it intended to be used as an aid in determining the scope of the claimed subject matter.

In some aspects, the present disclosure combines deep learning techniques in order to boost learning speed and improve performance. For example, in some aspects, the present disclosure uses reinforcement learning techniques to maximize the expected return of a vehicle over a sequence of actions, as well as Q-learning techniques to optimize the expected return. In further aspects, the present disclosure uses dynamic frame skipping to expedite learning repeated actions, and prioritized reply to ensure learning both positive and negative cases. Additionally, in various aspects, the present disclosure takes advantage of the off-policy nature imposed by experience replay learning to calculate and train on a full n-step return, which reduces the learning time of Deep Q-Networks (DQN). The techniques of the present disclosure for navigating unsignaled intersections also provide for improved performance over existing techniques as demonstrated by a comparison of the results of simulated traffic scenarios.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, and further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
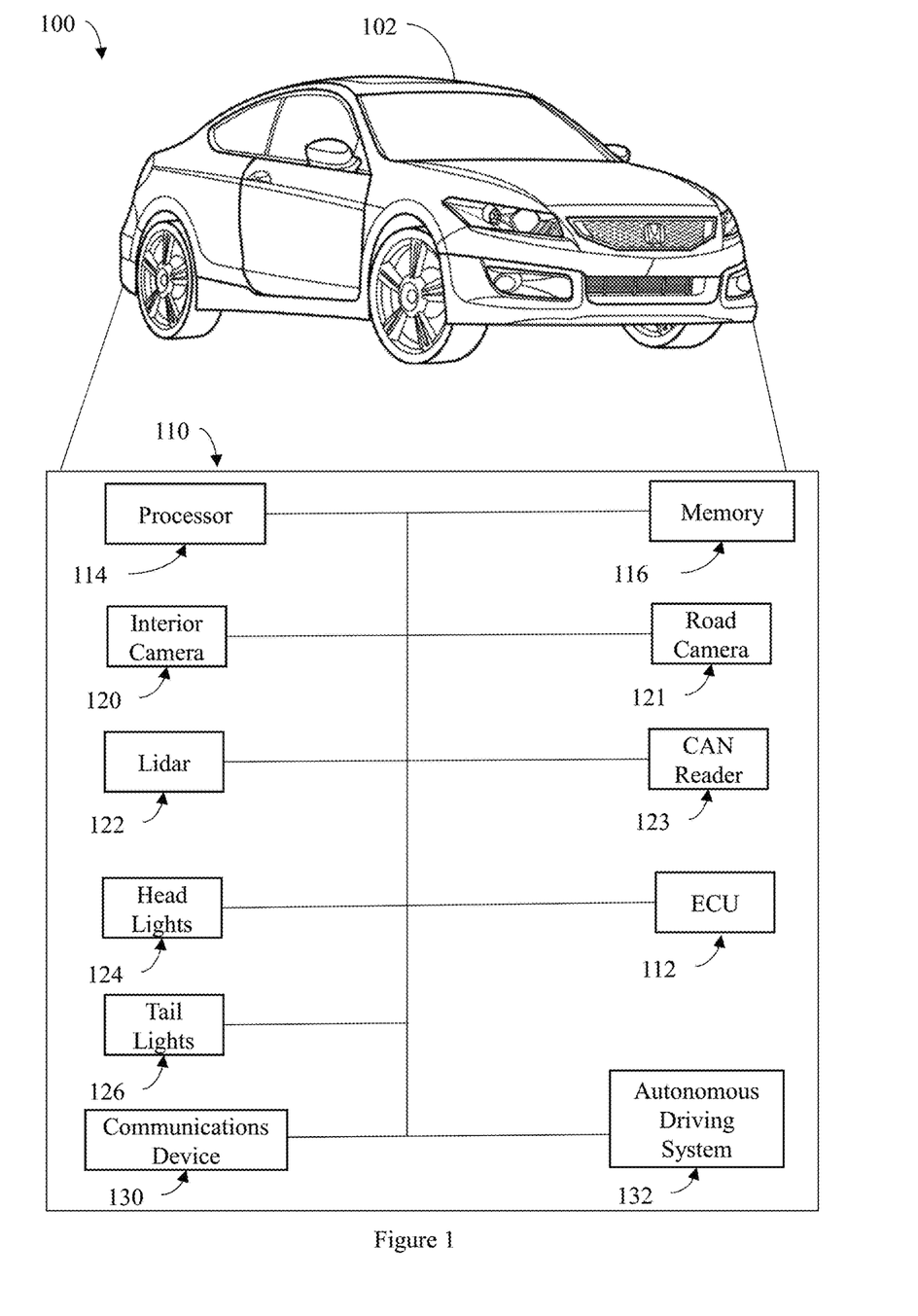
FIG. 1 illustrates a schematic view of an example operating environment of a vehicle system, according to aspects of the present disclosure.

Turning to FIG. 1, a schematic view of an example operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the vehicle system 110, among others, including vehicle HVAC systems, vehicle audio systems, vehicle video systems, vehicle infotainment systems, vehicle telephone systems, and the like. The vehicle system 110 may include a plurality of multi-modal sensors including, but not limited to, an interior camera 120, a road camera 121, a Lidar laser scanner 122, and a vehicle controller area network (CAN) reader 123. In some aspects, the plurality of multi-modal sensors may be connected to the ECU 112 to provide images of the environment surrounding the vehicle 102 and/or provide data related to operation of the vehicle 102. In further aspects, the CAN reader 123 may provide vehicle information including, but not limited to, speed, braking, throttle, steering, yaw rate, and velocity, etc. In some aspects, each of the signals from the plurality of multi-modal sensors may be synchronized to a common system clock.

The vehicle system 110 may also include a processor 114 and a memory 116 that communicate with the interior camera 120, road camera 121, Lidar laser scanner 122, vehicle controller area network (CAN) reader 123, head lights 124, tail lights 126, communications device 130, and autonomous driving system 132.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include head lights 124 and tail lights 126, which may include any conventional lights used on vehicles. The head lights 124 and tail lights 126 may be controlled by the vehicle system 110 and/or ECU 112 for providing various notifications. For example, the head lights 124 and/or tail lights 126 may be activated or controlled to provide desirable lighting when scanning the environment of the vehicle 102.

In some aspects, the autonomous driving system 132 may execute driving maneuvers based on instructions for executing processes for navigating an unsignaled intersection stored in the memory 116.

Figure 2:
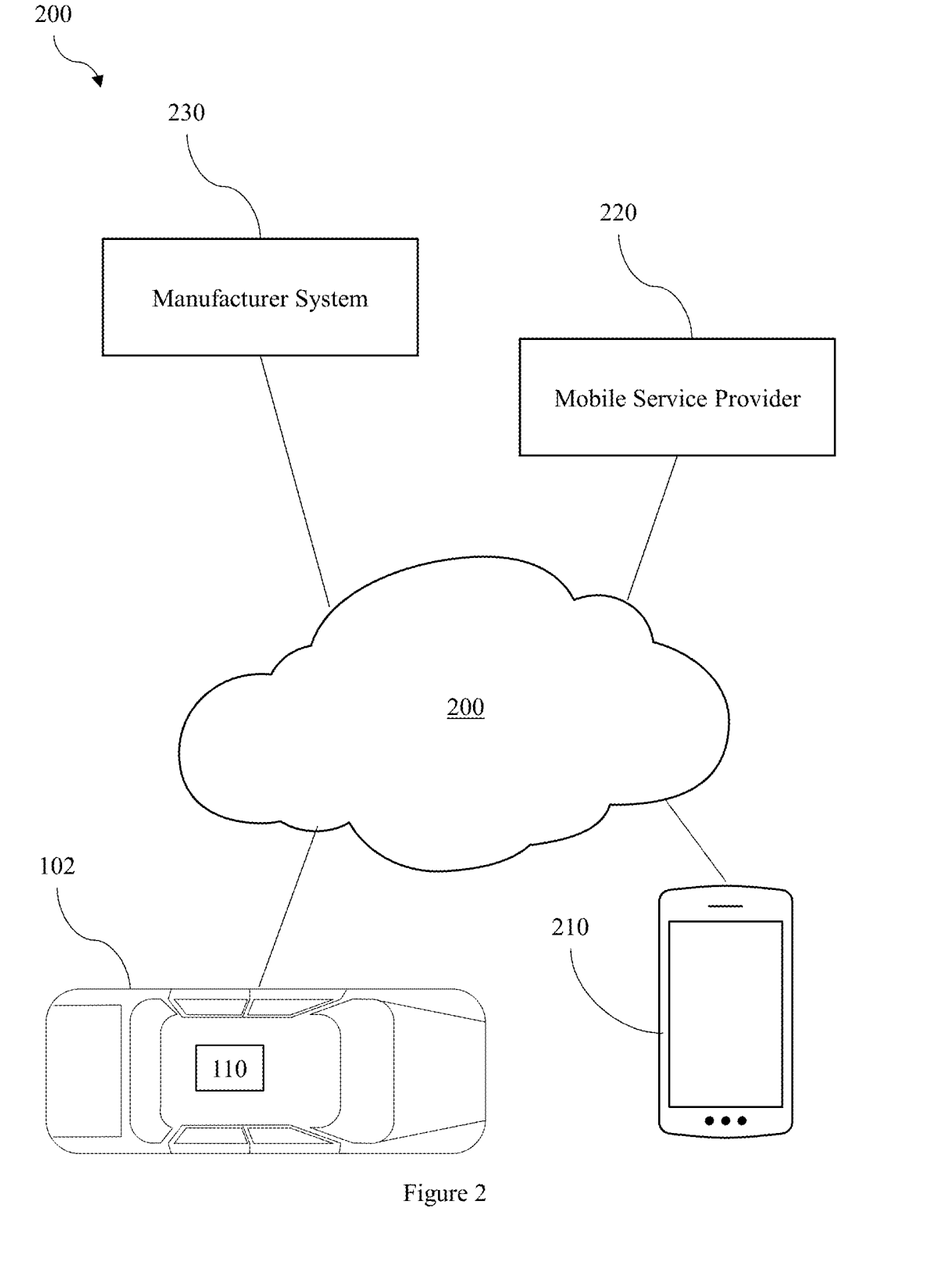
FIG. 2 illustrates an example network for managing the vehicle system, according to aspects of the present disclosure.

FIG. 2 illustrates an example network 200 for managing the vehicle system 110. The network 200 may be a communications network that facilitates communications between multiple systems. For example, the network 200 may include the Internet or another internet protocol (IP) based network. The network 200 may enable the vehicle system 110 to communicate with a mobile device 210, a mobile service provider 220, and/or a manufacturer system 230. The vehicle system 110 within the vehicle 102 may communicate with the network 200 via the communications device 130. The vehicle system 110 may, for example, may receive instructions for navigating an unsignaled intersection from the manufacturer system 230. Additionally, the vehicle system 110 may transmit data collected by the multi-modal sensors to the manufacturer system 230.

Figure 5:
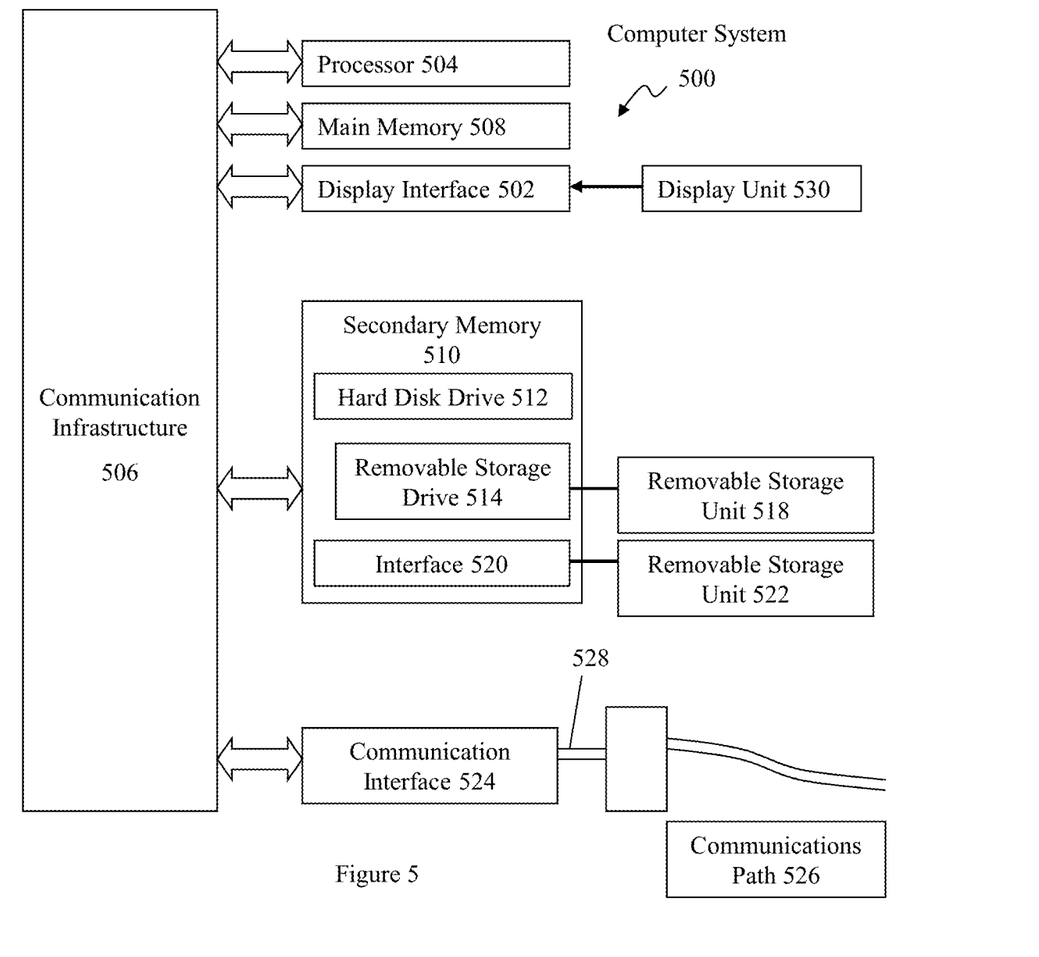
FIG. 5 illustrates various features of an example computer system for use in conjunction with aspects of the present disclosure.

The manufacturer system 230 may include a computer system, as shown with respect to FIG. 5 described below, associated with one or more vehicle manufacturers or dealers. The manufacturer system 230 may include one or more databases that store data collected by the front camera 120, roof camera 121, and/or the rear camera 122. The manufacturer system 230 may generate instructions for navigating an unsignaled intersection and transmit the instructions for navigating an unsignaled intersection to the vehicle 102. In some aspects, the manufacturer system 230 may also store the instructions for navigating an unsignaled intersection in a memory, e.g., a main memory 508 or secondary memory 510, as shown in FIG. 5.

To generate the instructions for navigating an unsignaled intersection, the manufacturer system 230 may use Deep Q-Networks (DQNs) to learn a state action value. To develop the DQNs, the manufacturer system 230 may execute a reinforcement learning framework. In the reinforcement learning framework, at a time t an agent (e.g., a simulation of the autonomous driving system 132) in a state $s_T$ may take an action at according to a policy 7C, and the agent may transition to a next state $s_{t+1}$, and may receive a reward $r_t$. In some aspects, the sequence of states, actions, and rewards may be given as a trajectory $\tau=\{(s_1, a_1, r_1), \ldots, (s_t, a_t, r_t)\}$ over a horizon T.

In further aspects, the reinforcement learning may be formulated as a Markov Decision Process (MDP) based on a set of states S, a set of actions A that the agent may execute, a state transition probability P, a reward function R, and a discount factor $\gamma$. In some aspects, MDPs may be based on the probability of transitioning to a new state given the current state and action, where the probability is independent of any previous state and action. In some aspects, the state transition probability P, which may be represented as P: $S \times S \rightarrow [0, 1]$, may describe systems dynamics; the reward function R, which may be represented as R: $S \times A \times S \rightarrow R$, may provide a real valued reward for a given time step; and the discount factor $\gamma$, which may be presented as $\gamma \in (0, 1]$, may add a preference for earlier rewards and provide stability in the case of infinite time horizons. In some aspects, the reinforcement learning framework may maximize an expected return value may be represented as $R=\Sigma_{t=0}^{T}\gamma^t r_t$ over a sequence of actions, and an expected return for a given state may be represented as $R_t=\Sigma_{k=0}^{T}\gamma^t r_{t+k}$.

In further aspects, the manufacturer system 230 may maximize the expected return by using a Q-learning framework. In the Q-learning framework, an action value function, which may be represented as $Q\pi(s,a)$, may be the expected return, which may be represented as $E[Rt|st=s,a]$, for a state-action pair following a given policy $\pi$. In some aspects, given an optimal value function, which may be represented as $Q^*(s,a)$, an optimal policy may be determined by selecting the action with a maximum value, which may be represented as $\max_a Q^*(s,a)$, at every time step.

Furthermore, the optimal value function may be approximated using a neural network, which may be represented as $Q^*(s,a) Q(s,a;\theta)$, based on one or more parameters $\theta$. In further aspects, the optimal value function may be learned by iteratively minimizing an error between the expected return and a value of the state-action pair predicted by the neural network based on equation (1):

$$L(\theta)=E[R_t|s_t=s,a]-Q(s,a;\theta))_2 \qquad (1)$$

In some aspects, the manufacturer system 230 may approximate a true return using a one-step return as shown in equation (2):

$$E[R_t | s_t = s, a] \approx r_t + \gamma \max_{at+1} Q(st + 1, at + 1; \theta) \qquad (2)$$

In further aspects, learning may be achieved using an n-step return to improve efficiency. For example, the n-step return may be determined using equation (3):

$$E[R_t|s_t=s,a] \approx r_t + \gamma rt+1+ \ldots +\gamma_{n-1}rt+n-1+\gamma n \max a_{t+n}Q (st+n,at+n;\theta) \qquad (3).$$

Additionally, during learning, the manufacturer system 230 may execute an c-greedy policy by selecting a random action with a probability c to promote random exploration, and by selecting a best action with a highest probability according to a current network, e.g., $\max_a Q(s,a;\theta)$.

In some aspects, to generate the instructions for navigating an unsignaled intersection, the manufacturer system 230 may also use dynamic frame skipping to improve the effectiveness of the random exploration. For example, the manufacturer system 230 may select actions over extended time periods to improve the learning time of the manufacturer system 230. In some various aspects, rather than exploring through trial and error to learn the appropriate amount of time to wait for a car to pass, the manufacturer system 230 may discover that, for example, a "wait eight steps" action is appropriate. In some aspects, the dynamic frame skipping may also be executed by the autonomous driving system 132.

In further aspects, to generate the instructions for navigating an unsignaled intersection, the manufacturer system 230 may also prioritize an experience replay. For example, the manufacturer system 230 may utilize an experience replay buffer to break correlations between sequential steps of the vehicle 102. To achieve this, one or more experience replay buffers may store previous trajectories. By using the one or more experience replay buffers, important sequences may be preferentially sampled even if these important sequences occur less frequently. In some aspects, the experience replay may perform such sampling to balance reward across trajectories, thereby avoiding the computation of a rank list. In some aspects, the one or more experience replay buffers may store approximately 100,000 time steps, although it should be understood by those of ordinary skill in the art that any number of time steps may be stored. In some aspects, the one or more experience replay buffers may include a first experience reply buffer to store collisions and a second experience replay buffer to store successes and timeouts. In various aspects, at each learning iteration, the manufacturer system 230 may sample a plurality of steps, e.g., 25 steps from each buffer for a total batch size of, for example, 50 steps. In further aspects, the one or more experience replay buffers may impose off-policy learning, and as such, the manufacturer system 230 may calculate the return for each state-action pair in the trajectory prior to adding each step into the experience replay buffer.

In various aspects, the manufacturer system 230 may generate a plurality of state-action representations using one or more DQNs, such as a Sequential Action DQN, Time-To-Go DQN, and/or a Creep-and-Go DQN. In some aspects, each of the DQNs may be based on the reinforcement learning frame, the Q-learning framework, the dynamic frame skipping, and/or the prioritized replay experience. In the Sequential Action DQN, a desired path may be provided to the autonomous driving system 132, and the autonomous driving system 132 may determine to accelerate, decelerate, or maintain constant velocity at every point in time along the desired path. In some aspects, a space surrounding the vehicle 102 may be discretized into a grid in Cartesian coordinates relative to a reference frame of the vehicle 102. In some aspects, this representation may be constructed from scans retrieved by the LIDAR scanner 122. For example, in various aspects, in the Sequential Action DQN, the space surrounding the vehicle 102 may be represented as a5×11 grid discretizing 0 to 20 meters in front of the vehicle 102 and ±90 meters to the left and right of the vehicle 102. In further aspects, in the Sequential Action DQN, a 5×11×3 representation of the space may result in a 165 dimensional space. Alternatively, for the Time-to-Go DQN, the space surrounding the vehicle 102 may be represented as a 18×26 grid in global coordinates.

In further aspects, in the Sequential Action DQN, one or more vehicles surrounding the vehicle 102 in the space may be represented by its respective heading angle, velocity, and/or calculated time to collision, which may each be represented as a real value. In further aspects, for the Time-to-Go DQN, one or more vehicles surrounding the vehicle 102 in the space may be represented by its respective heading angle, velocity, and bias term, which may each be represented as a real value.

In various aspects, the Sequential Action DQN may be a fully connected network with leaky rectified linear unit (ReLU) activation functions. The network may include three (3) hidden layers each of 100 nodes and a final linear layer with 12 outputs corresponding to three actions (accelerate, decelerate, maintain velocity) at four time scales (1, 2, 4, and 8 time steps).

In the Time-to-Go DQN, a desired path may be provided to the vehicle 102, and the vehicle 102 may determine the timing of departure through a sequence of decisions to wait or go. For example, in some aspects, every wait action may be followed by another wait or go decision. As a result, each trajectory may be a series of wait decisions terminating in a go decision, and the vehicle 102 may not be allowed to wait after the go action has been selected.

In some aspects, the Time-to-Go DQN may use a convolutional neural network with two convolution layers, and one fully connected layer. The first convolution layer may have thirty-two (32) 6×6 filters with stride 2, and the second convolution layer may have sixty-four (64) 3×3 filters with stride 2. In further aspects, the fully connected layer may have 100 nodes. Each of the layers may use leaky ReLU activation functions. In various aspects, a final linear output layer has five outputs: a single go action, and a wait action at four time scales (1, 2, 4, and 8 time steps).

In some aspects, the Creep-and-Go DQN may be a hybrid of the Sequential Action DQN and the Time-to-Go DQN. For example, the Creep-and-Go DQN may involve three actions: wait, move forward slowly, and go. In some aspects, once a go action is selected, the vehicle 102 may continue all the way through the intersection. As a result, the vehicle 102 may choose between moving up slowly and stopping before finally choosing a go action. In some aspects, the Creep-and-Go DQN may be used to handle intersections with occlusions, e.g., objects that are obstructed from the view of the vehicle 102.

In some aspects, the Sequential Action DQN may allow for more complex behaviors than the Time-to-Go DQN. For example, the autonomous driving system 132 may slow down the vehicle 102 half way through the intersection and wait for on-coming traffic to pass when using the Sequential Action DQN. In contrast, the Time-to-Go DQN may focus on the departure time, thereby allowing the vehicle 102 to determine how changes in departure time can affect performance. In further aspects, the Creep-and-Go DQN offers easier interpretability and ease of learning in a restricted action space much like the Time-to-Go DQN, while still making exploratory actions available to the vehicle 102 like in the Sequential Action DQN.

In various aspects, the manufacturer system 230 may train the one or more DQNs based on a variety of intersection scenarios. For example, in some aspects, the manufacturer system 230 may train the one or more DQNs using a traffic simulation package. This traffic simulation package may allow users to model road networks, road signs, traffic lights, a variety of vehicles (including public transportation), and pedestrians, etc., to simulate traffic conditions in different types of scenarios. Thus, for any traffic scenario, users may control a vehicle's position, velocity, acceleration, steering direction, and may further simulate motion using basic kinematics models. Furthermore, traffic scenarios, such as multi-lane intersections, may be setup by defining a road network (e.g., lanes and intersections), along with specifications that control traffic conditions. To simulate traffic, users may also control the types of vehicles, road paths, vehicle density, departure times, etc. Traffic cars follow an Intelligent Driver Model (IDM) to control motion. Furthermore, randomness may be simulated by varying the speed distribution of the vehicles, and by using parameters that control driver imperfection based on a stochastic driving model, such as the Krauss stochastic driving model. The simulator may run based on a predefined time interval, which controls the length of every step.

Figure 3A:
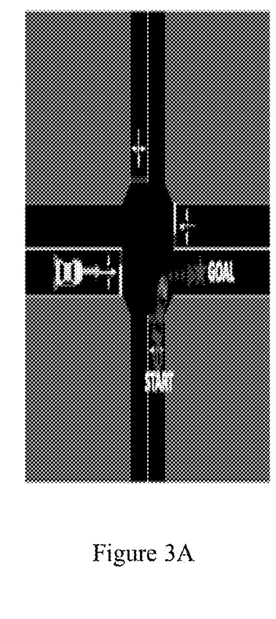
FIGS. 3A-3E illustrate example training scenarios, according to aspects of the present disclosure.
Figure 3B:
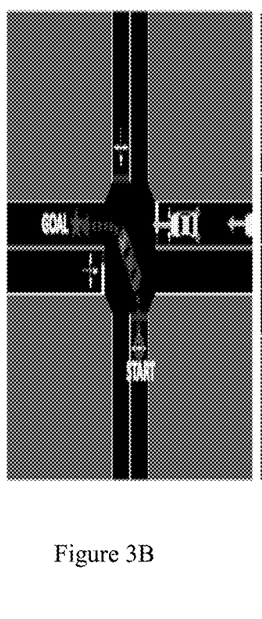
Figure 3C:
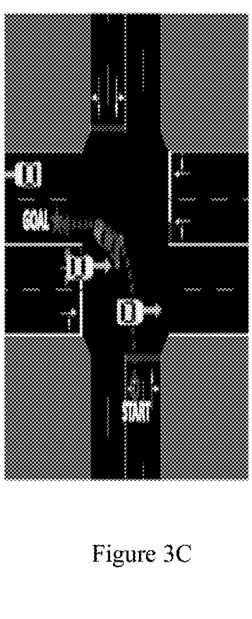
Figure 3D:
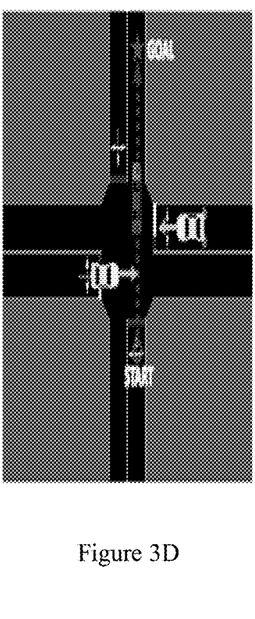
Figure 3E:
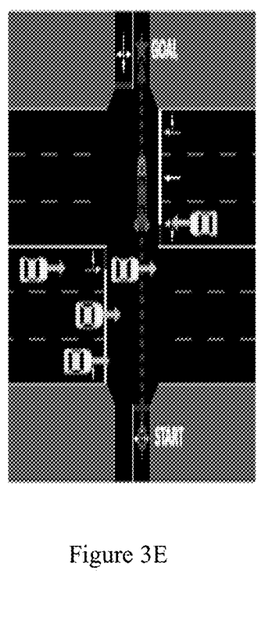

In some aspects, the manufacturer system 230 may train the Sequential Action and Time-to-Go DQNs using a plurality of intersection scenarios. For example, a plurality of intersection training scenarios may include, but are not limited to: Right, Left, Left2, Forward and a Challenge, as illustrated in FIGS. 3A-3E, respectively. The Right training scenario involves making a right turn through an intersection (as shown in FIG. 3A), the Forward training scenario involves crossing the intersection (as shown in FIG. 3B), the Left training scenario involves making a left turn through the intersection (as shown in FIG. 3C), the Left2 training scenario involves making a left turn across two lanes through the intersection (as shown in FIG. 3D), and the Challenge training scenario involves crossing a six lane intersection with increased traffic density (as shown in FIG. 3E).

In accordance with some aspects, in each of the plurality of intersection training scenarios, each lane of the road has a speed limit of 45 miles per hour (or 20 m/s), although it should be understood by those of ordinary skill in the art that other speed limits are further contemplated according to aspects of the present disclosure. Furthermore, during training, each time step may be 0.2 seconds, although it should be understood by those of ordinary skill in the art that other time steps are further contemplated according to aspects of the present disclosure. For example, in some aspects, a time step of 0.2 seconds may be used for each of the scenarios except the Challenge scenario, in which the time step may be set to another value, such as 0.7 seconds. In some aspects, a max number of steps per trial may be capped at, for example, 100 steps, which is equivalent to 20 seconds. In some aspects, traffic density may be set by the probability that a vehicle will be emitted randomly per second. In each of the plurality of training scenarios, the vehicle 102 may begin from a stopped position.

In further aspects, each of the plurality of intersection training scenarios may be evaluated according to a plurality of metrics and based on a plurality of trials, e.g., 10,000 trials. In some aspects, the plurality of metrics include:
Percentage of successes: the percentage of the runs vehicle 102 successfully reached the goal, including collisions and time-outs;
Percentage of collisions: a measure of safety;
Average time: how long it takes a successful trial to run to completion; and
Average braking time: the amount of time other cars in the simulator are braking, i.e., how disruptive the vehicle 102 is to traffic.

Table I below shows the results comparing aspects of the present disclosure with previous attempts at navigating unsignaled intersections. As illustrated in Table I, the Sequential and Time-to-Go DQNs are more efficient reaching the goal than, for example, TTC. In some aspects, the Time-to-Go DQN has the best task completion time in all scenarios, except Forward, where the Sequential Action DQN is faster. Furthermore, on average, the Time-to-Go DQN is 28% faster in reaching to goal than TTC, and the Sequential Action DQN is 19% faster in reaching to goal than TTC. Furthermore, as illustrated in Table I, both the Sequential and Time-to-Go DQNs yield a 99.5% success rate for each training scenario, except the Challenge scenario. Therefore, the Sequential and Time-to-Go DQNs help reduce traffic jams due to their efficiency navigating unsignaled intersections. This is mainly due to the Sequential and Time-to-Go DQNs taking into account predictive behavior of the traffic. The Sequential and Time-to-Go DQNs generally accurately predict that traffic in distant lanes may have passed by the time the vehicle 102 arrives at the lane, such that the vehicle 102 may anticipate whether oncoming traffic will have sufficient time to brake or not.

TABLE I

| Scenario | Metric | Random | TTC | DQN-Sequential | DQN-Time-to-Go |
|---|---|---|---|---|---|
| Right | % Success | 66.06 | 99.61 | 99.5 | 99.96 |
| | Avg. Time | 13.2 | 6.46 s | 5.47 s | 4.63 s |
| | Avg. Brake | 6.0 | 0.31 s | 0.88 s | 0.45 s |
| Left | % Success | 45.9 | 99.7 | 99.99 | 99.99 |
| | Avg. Time | 13.82 s | 6.97 s | 5.26 s | 5.24 s |
| | Avg. Brake | 4.51 s | 0.52 s | 0.38 s | 0.46 s |
| Left2 | % Success | 45.45 | 99.42 | 99.79 | 99.99 |
| | Avg. Time | 14.48 s | 7.59 s | 7.13 s | 5.40 s |
| | Avg. Brake | 1.47 s | 0.21 s | 0.22 s | 0.20 s |
| Forward | % Success | 66.20 | 99.91 | 99.76 | 99.78 |
| | Avg. Time | 12.88 s | 6.19 s | 4.40 s | 4.63 s |
| | Avg. Brake | 4.65 s | 0.57 s | 0.61 s | 0.48 s |
| Challenge | % Success | 29.99 | 39.2 | 82.97 | 98.46 |
| | Avg. Time | 15.7 s | 12.55 s | 9.94 s | 7.94 s |
| | Avg. Brake | 9.47 s | 1.65 s | 1.94 s | 1.98 s |

In some aspects, the manufacturer system 230 may train the Creep-and-Go DQN using a plurality of intersection scenarios that include occlusions. For example, as shown in FIG. 3F, an example training intersection includes an intersection where the goal is to make a left turn across two lanes in the presence of occlusions. In some aspects, a visible area is may be modeled using a ray tracing approach to find occluded cells in the grid and occlusions may be randomly selected to appear on the left, right, or both sides of the intersection. In the training example, the occlusions may vary in dimension, e.g., length and width, and may be positioned a distance from a left most boundary of that side, e.g., left, right, or both sides of the intersection. Table II illustrates the results of occlusion training scenario.

TABLE II

| Occlusion Length | Metric | TTC vs creep | DQN-Time-to-Go | DQN-Creep | DQN-Sequential |
|---|---|---|---|---|---|
| 30 m | % Success | 84.1 | 70.7 | 92.8 | 92.6 |
| | Avg. Time | 28.6 s | 12.0 s | 11.7 s | 9.6 s |
| 60 m | % Success | 83.1 | 57.2 | 92.9 | 88.9 |
| | Avg. Time | 28.9 s | 21.3 s | 16.0 | 9.91 s |
| 90 m | % Success | 87.6 | 26.3 | 96.3 | 86.2 |
| | Avg. Time | 28.7 s | 20.8 s | 16.0 s | 10.25 s |

As shown in Table II, the Sequential Action DQN may reach the point of full visibility the fastest, however the restricted action space of the Creep-and-Go DQN easier to learn and leads to a higher success rate. Additionally, the creep forward behavior of the Creep-and-Go DQN may also bring the car closer to the goal when the intersection is blocked, and as a result the methods without the creeping behavior tend to take longer on average. Furthermore, TTC without creeping incorrectly assumes the road is clear, thereby resulting in more collisions. And even though TTC with creeping behavior has no collisions, TTC with creeping behavior has a high percentage of timeouts. In contracts, the Creep-and-Go DQN may learn and perform the specialized behavior more efficiently than TTC.

In various aspects, the manufacturer system 230 may generate the instructions for navigating the unsignaled intersection based on the one or more DQNs and transmit the instructions to the vehicle 102.

Figure 4:
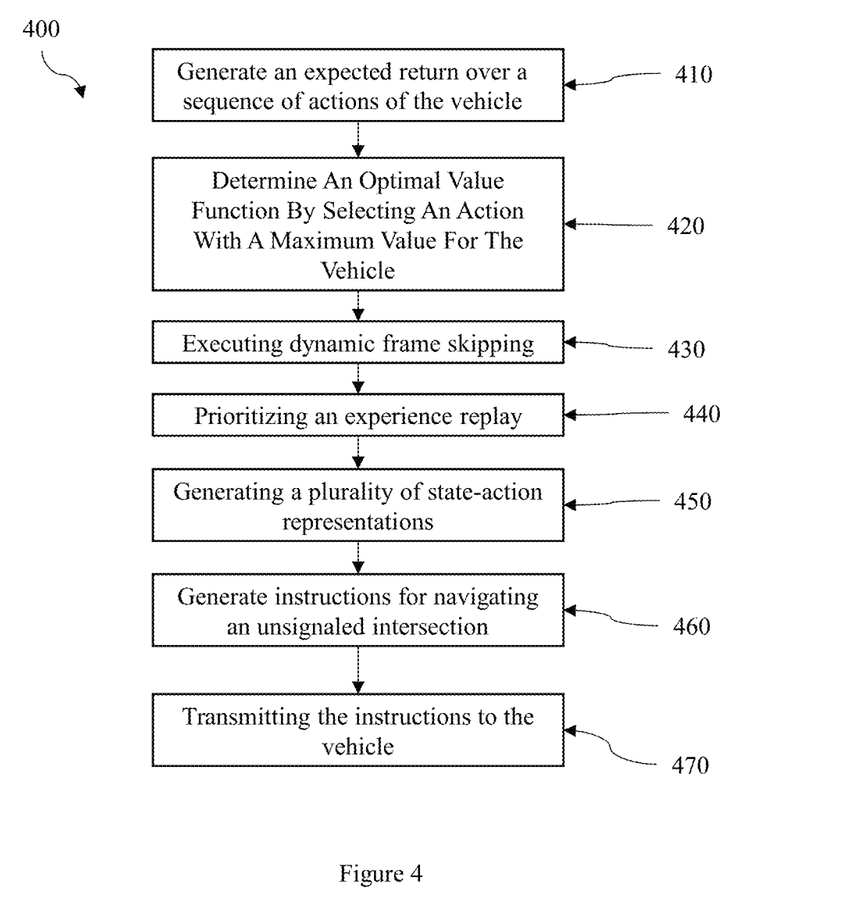
FIG. 4 illustrates a flowchart method for generating instructions for a vehicle to navigate an unsignaled intersection, according to aspects of the present disclosure.

FIG. 4 illustrates a flowchart method for generating instructions for a vehicle to navigate an unsignaled intersection. A method 400 includes generating an expected return over a sequence of actions of the vehicle 410. The method also includes determining an optimal value function by selecting an action with a maximum value for the vehicle 420. The method further includes executing dynamic frame skipping to expedite learning a repeated action of the vehicle 430, and prioritizing an experience replay by utilizing an experience replay buffer to break correlations between sequential steps of the vehicle 440. The method also includes generating a plurality of state-action representations based on at least one of the expected return, the optimal policy, the dynamic frame skipping, or the prioritized experience replay 450. The method also includes generate the instructions for navigating the unsignaled intersection based on the plurality of state-action representations 460 and transmitting the instructions to the vehicle such that the vehicle executes the instruction to navigate the unsignaled intersection 470.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512, and/or a removable storage drive 514, representing a floppy disk drive, a magnetic tape drive, an optical disk drive, a universal serial bus (USB) flash drive, etc. The removable storage drive 514 reads from and/or writes to a removable storage unit 518 in a well-known manner. Removable storage unit 518 represents a floppy disk, magnetic tape, optical disk, USB flash drive etc., which is read by and written to removable storage drive 514. As will be appreciated, the removable storage unit 518 includes a computer usable storage medium having stored therein computer software and/or data.

Alternative aspects of the present disclosure may include secondary memory 510 and may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 518, a hard disk installed in hard disk drive 512, and signals 528. These computer program products provide software to the computer system 500. Aspects of the present disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features in accordance with aspects of the present disclosure, as discussed herein. In particular, the computer programs, when executed, enable the processor 504 to perform the features in accordance with aspects of the present disclosure. Accordingly, such computer programs represent controllers of the computer system 500.

In an aspect of the present disclosure implemented using software, the software may be stored in a computer program product and loaded into computer system 500 using removable storage drive 514, hard drive 512, or communications interface 520. The control logic (software), when executed by the processor 504, causes the processor 504 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system for generating instructions for a vehicle to navigate an unsignaled intersection, the system comprising:
   a memory that stores instructions for executing processes for generating instructions for navigating the unsignaled intersection; and
   a processor configured to execute the instructions, wherein the processes comprise:
      generate an expected return over a sequence of actions of the vehicle;
      determine an optimal policy by selecting an action with a maximum value for the vehicle, wherein the action is selected from a plurality of randomly selected actions;
      execute dynamic frame skipping by selecting to skip a value of frames for a time period of captured frames to expedite learning a repeated action of the vehicle;
      prioritize an experience replay by utilizing a first experience replay buffer based on off-policy learning and a second experience replay buffer based on them off-policy learning to break correlations between sequential steps of the vehicle, wherein the first experience replay buffer is associated with positive experiences and the second experience replay buffer is associated with neutral or negative experiences;
      generate a plurality of state-action representations based on at least one of the expected return, the optimal policy, the dynamic frame skipping, or the prioritized experience replay;
      generate the instructions for navigating the unsignaled intersection based on the plurality of state-action representations; and
      transmit the instructions for navigating the unsignaled intersection to the vehicle such that the vehicle executes the instructions to navigate the unsignaled intersection.

2. The system of claim 1, wherein the plurality of state-action representations comprise one or more Deep Q-Networks (DQNs).

3. The system of claim 2, wherein the processor is further configured to discretize a space surrounding the vehicle into a grid relative to a reference frame of the vehicle, wherein the space surrounding the vehicle is constructed based on scans retrieved from the vehicle.

4. The system of claim 3, wherein the one or more DQNs include two or more DQNs;
   for a first DQN of the two or more DQNs, one or more secondary vehicles surrounding the vehicle in the space are represented by at least one of a respective heading angle, velocity, or calculated time to collision; and
   for a second DQN of the two or more of DQNs, one or more secondary vehicles surrounding the vehicle in the space are represented by at least one of a respective heading angle, velocity, and bias term.

5. The system of claim 3, wherein a first DQN of the one or more of DQNs comprises a fully connected network with leaky rectified linear unit (ReLU) activation functions, and wherein the fully connected network includes:
   three hidden layers that each including a plurality of nodes, and
   a linear layer with a plurality of outputs corresponding to a plurality of actions of the vehicle at a plurality of time scales.

6. The system of claim 3, wherein a first DQN of the one or more of DQNs comprises a convolutional neural network including a plurality of convolution layers, a fully connected layer, and a linear output layer, and wherein each of the plurality of convolution layers and the fully connected layer utilize leaky rectified linear unit (ReLU) activation functions, and wherein the linear output layer comprises a plurality of outputs.

7. The system of claim 2, wherein the processor is further configured to train the one or more DQNs based on simulated traffic.

8. A method for generating instructions for a vehicle to navigate an unsignaled intersection, the method comprising:
generating an expected return over a sequence of actions of the vehicle;
determining an optimal policy by selecting an action with a maximum value for the vehicle, wherein the action is selected from a plurality of randomly selected actions;
executing dynamic frame skipping by selecting to skip a value of frames for a time period of captured frames to expedite learning a repeated action of the vehicle;
prioritizing an experience replay by utilizing a first experience replay buffer based on off-policy learning and a second experience replay buffer based on them off-policy learning to break correlations between sequential steps of the vehicle, wherein the first experience replay buffer is associated with positive experiences and the second experience replay buffer is associated with neutral or negative experiences;
generating a plurality of state-action representations based on at least one of the expected return, the optimal policy, the dynamic frame skipping, or the prioritized experience replay;
generating the instructions for navigating the unsignaled intersection based on the plurality of state-action representations; and
transmitting the instructions to the vehicle such that the vehicle executes the instructions to navigate the unsignaled intersection.

9. The method of claim 8, wherein the plurality of state-action representations comprise one or more Deep Q-Networks (DQNs).

10. The method of claim 9, wherein the method further comprises discretizing a space surrounding the vehicle into a grid relative to a reference frame of the vehicle, wherein the space surrounding the vehicle is constructed based on scans retrieved from the vehicle.

11. The method of claim 10, wherein the one or more DQNs include two or more DQNs;
for a first DQN of the two or more DQNs, one or more secondary vehicles surrounding the vehicle in the space are represented by at least one of a respective heading angle, velocity, or calculated time to collision; and
for a second DQN of the two or more DQNs, one or more secondary vehicles surrounding the vehicle in the space are represented by at least one of a respective heading angle, velocity, and bias term.

12. The method of claim 9, wherein a first DQN of the one or more DQNs comprises a fully connected network with leaky rectified linear unit (ReLU) activation functions, and wherein the fully connected network includes:
three hidden layers that each including a plurality of nodes, and
a linear layer with a plurality of outputs corresponding to a plurality of actions of the vehicle at a plurality of time scales.

13. The method of claim 9, wherein a first DQN of the one or more DQNs comprises a convolutional neural network including a plurality of convolution layers, a fully connected layer, and a linear output layer, wherein each of the plurality of convolution layers and the fully connected layer utilize leaky rectified linear unit (ReLU) activation functions, and wherein the linear output layer comprises a plurality of outputs.

14. The method of claim 9, further comprising training the one or more DQNs based on simulated traffic.

15. A non-transitory computer-readable storage medium containing executable computer program code, the code comprising instructions configured to:
generate an expected return over a sequence of actions of a vehicle;
determine an optimal policy by selecting an action with a maximum value for the vehicle, wherein the action is selected from a plurality of randomly selected actions;
execute dynamic frame skipping by selecting to skip a value of frames for a time period of captured frames to expedite learning a repeated action of the vehicle;
prioritize an experience replay by utilizing a first experience replay buffer based on off-policy learning and a second experience replay buffer based on them off-policy learning to break correlations between sequential steps of the vehicle, wherein the first experience replay buffer is associated with positive experiences and the second experience replay buffer is associated with neutral or negative experiences;
generate a plurality of state-action representations based on at least one of the expected return, the optimal policy, the dynamic frame skipping, or the prioritized experience replay;
generate instructions for navigating an unsignaled intersection based on the plurality of state-action representations; and
transmit the instructions to the vehicle such that the vehicle executes the instructions to navigate the unsignaled intersection.

16. The non-transitory computer-readable storage medium of claim 15, wherein the plurality of state-action representations comprise one or more Deep Q-Networks (DQNs).

17. The non-transitory computer-readable storage medium of claim 16, wherein the code further comprising instructions to discretize a space surrounding the vehicle into a grid relative to a reference frame of the vehicle, wherein the space surrounding the vehicle is constructed based on scans retrieved from the vehicle.

18. The non-transitory computer-readable storage medium of claim 17,
wherein the one or more DQNs include two or more DQNs;
for a first DQN of the two or more DQNs, one or more secondary vehicles surrounding the vehicle in the space are represented by at least one of a respective heading angle, velocity, or calculated time to collision; and
for a second DQN of the two or more DQNs, one or more secondary vehicles surrounding the vehicle in the space are represented by at least one of a respective heading angle, velocity, and bias term.

19. The non-transitory computer-readable storage medium of claim 16, wherein:
a first DQN of the one or more DQNs comprises a fully connected network with leaky rectified linear unit (ReLU) activation functions, and wherein the fully connected network includes:
three hidden layers that each including a plurality of nodes, and a linear layer with a plurality of outputs corresponding to a plurality of actions of the vehicle at a plurality of time scales; and a second DQN of the one or more DQNs comprises a convolutional neural network including a plurality of convolution layers, a fully connected layer, and a linear output layer, wherein each of the plurality of convolution layers and the fully connected layer utilize leaky rectified linear unit (ReLU) activation functions, and wherein the linear output layer comprises a plurality of outputs.

20. The non-transitory computer-readable storage medium of claim 15, wherein the code further comprising instructions to train one or more DQNs based on simulated traffic.

* * * * *